United States Patent [19]

Turner

[11] 4,043,593
[45] Aug. 23, 1977

[54] VEHICLE SEATS
[75] Inventor: Harold Roy Turner, Sutton Coldfield, England
[73] Assignee: L.C.P. Group Services Limited, Brierley Hill, England
[21] Appl. No.: 629,097
[22] Filed: Nov. 5, 1975
[30] Foreign Application Priority Data
Nov. 9, 1974 United Kingdom ............... 48613/74
[51] Int. Cl.² .............................................. A47C 1/02
[52] U.S. Cl. .................................... 297/341; 248/395
[58] Field of Search ................... 248/395, 429, 430; 297/317, 318, 341, 342

[56] References Cited
U.S. PATENT DOCUMENTS

| 2,160,015 | 5/1939 | Haberstump | 297/341 |
| 2,770,286 | 11/1956 | Weller | 248/430 X |
| 3,853,373 | 12/1974 | Corbett | 297/341 |
| 3,880,462 | 4/1975 | Mednick | 297/318 X |
| 3,957,312 | 5/1976 | Bonnaud | 297/341 |

FOREIGN PATENT DOCUMENTS

| 463,674 | 12/1913 | France | 297/341 |
| 458,925 | 12/1936 | United Kingdom | 297/318 |

*Primary Examiner*—James C. Mitchell
*Attorney, Agent, or Firm*—Marshall & Yeasting

[57] ABSTRACT

A car seat frame has the backrest hinged to the seat cushion frame and to the vehicle floor, so that when tipped forwardly the seat cushion frame is slid forwardly and vice versa. The front of the cushion frame runs in a guide including staggered upper and lower elements so that lifting of the rear of the cushion frame at the beginning of the movement allows the frame to run freely through the guide, and so that lowering at the end of the return movement causes the guide to snub the frame and prevent rattle.

7 Claims, 4 Drawing Figures

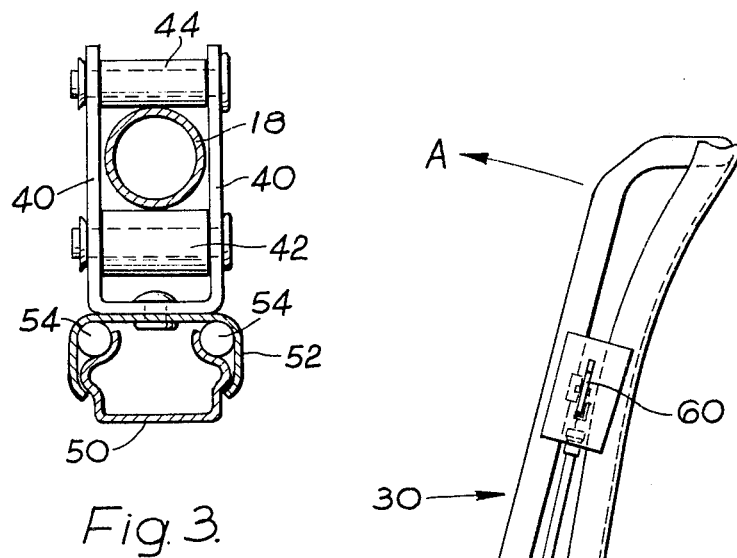
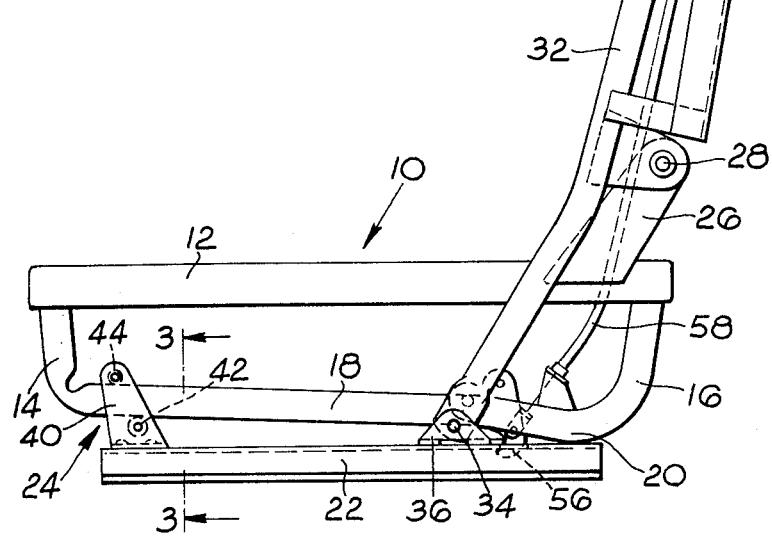

VEHICLE SEATS

BACKGROUND OF THE INVENTION

This invention relates to vehicle seats. It is conventional in two-door motor cars to mount the driver's and front passenger seats on pivots located below the forward portions of the seats, so that the seats can be tipped forwardly to increase clearance space behind these seats and enable access to be had to any luggage space or rear seat of the car. The extent of tipping movement possible is usually limited by the backrest coming into contact with the steering wheel, instrument panel or possibly the windscreen, and a problem arises because the lower part of the seat and back moves in an arc about a smaller radius than the top of the seat back, and hence moves through a smaller distance fore and aft, and this restricts access at positions near the floor of the vehicle.

To overcome the aforementioned problem it has been suggested to mount the seat cushion frame for sliding movement in a fore and aft direction, and to use the backrest as a lever by pivoting it at its lower end to a fixed point relative to the vehicle and pivoting near its lower end to the seat cushion frame. This enables the whole seat cushion to be translated forwardly and increase the clearance behind the seat particularly at the lower level, when the backrest is tipped. However, rattle or vibration, particularly of an unoccupied seat, is always a problem with vehicle seat design where any capability for movement is provided, and in practice it is found that if guides or slides mounting the seat cushion frame for its fore and aft movement are sufficiently loose to allow free sliding during the tipping of the backrest, vibration and rattle when the seat is unoccupied is a serious problem, and if the slides or guides are made tighter, the sliding movement is only accomplished with difficulty. Additionally constructions of this kind have hitherto had the seat cushion spaced well above the floor of the vehicle in order to provide clearance for associated adjusting devices, which has led to the cushion being supported on a pedestal frame and it has been found that this increases the possibility of distortion occurring, and hence of jamming for example if grit becomes trapped in the slides.

SUMMARY OF THE INVENTION

The object of the present invention is to provide an improved construction of seat of the kind in which tipping of the backrest displaces the seat cushion forwardly.

In accordance with the invention a seat of the kind comprising a seat back pivoted at its lower part to a seat base, and further pivoted below the seat base to an attachment point, in which the seat base is slidable fore and aft when the seat back is pivoted, is characterised in that the seat base comprises a frame including at least one element extending between a pair of guides which are spaced apart in a fore and aft direction, the lower guide being located nearer to the backrest.

Preferably the said lower of the guides comprises a nylon roller or other relatively low friction means for guiding the frame in its sliding, and which is slightly compressible, and the upper guide is a metal bracket. The geometry is preferably such that the forward tipping lifts the rear of the seat base slightly and at the return to normal position for occupation of the seat when the rear of the seat cushion frame pivots downwardly, this nylon or like guide will compress to clamp the frame firmly between it and the other guide.

Preferably the seat is held in a normal position for use and against tipping and forward displacement by a catch which may be duplicated on the respective sides of the seat.

Preferably also the seat cushion frame is mounted on a conventional slide mechanism for fore and aft adjustment of the seat in its position for occupation, and then the backrest pivot is mounted on one end of the slider and the abutments on the other of the same.

BRIEF DESCRIPTION OF THE DRAWINGS

FIG. 1 is an elevation of a first embodiment of a seat frame in accordance with the invention, showing the same in the normal position for use;

FIG. 3 is a section on an enlarged scale taken on the line 3—3 of FIG. 1;

DESCRIPTION OF THE PREFERRED EMBODIMENTS

Figure 2:
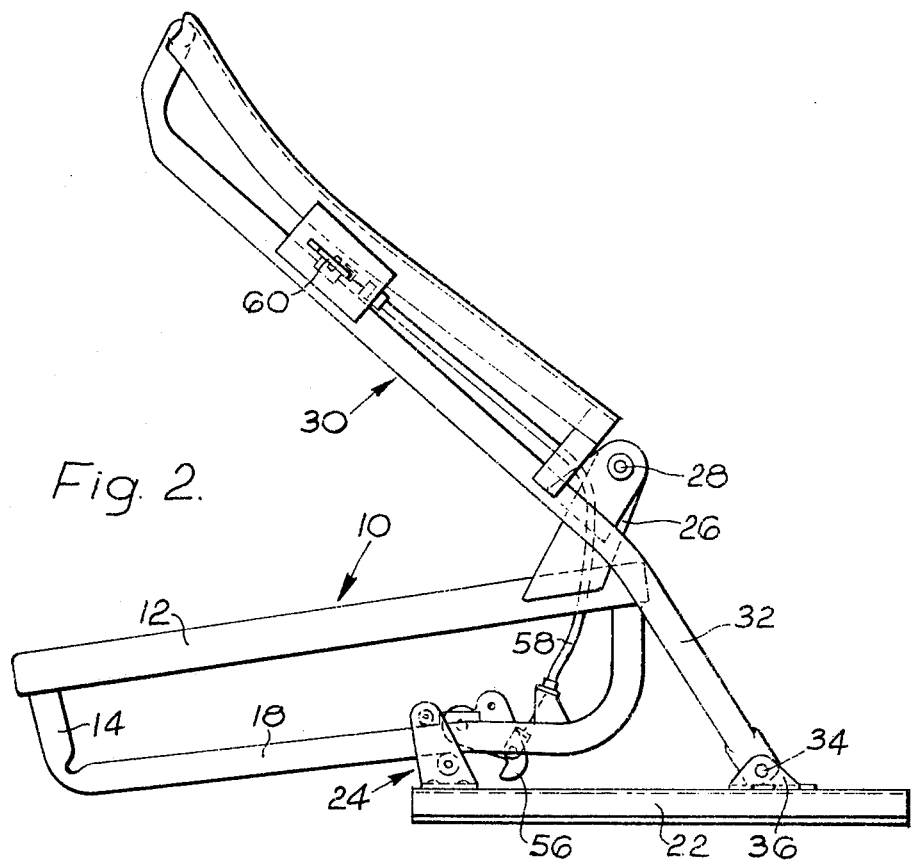
FIG. 2 is a view similar to FIG. 1 showing the same seat frame in a forward tipped position.

Referring to the drawings and particularly the FIGS. 1 to 3 thereof, the seat comprises a seat base or cushion frame generally indicated by the reference numeral 10 and which may comprise a peripheral framing element 12 supporting the seat cushion and secured thereto on each of the lateral sides of the same a pair of generally U shaped tubes forming a pedestal, having front limbs 14, rear limbs 16, and generally horizontally extending lower limbs 18. The lower limbs are shaped to have portions 20 which seat on the vehicle floor or upon slides 22 mounted on to the floor, and a major portion of the limbs 18 is relatively straight and extends through a guide generally indicated by the reference numeral 24.

Fixed to the framing element 12 is a pair of upstanding lugs 26 affording a hinge axis 28 on which the back rest generally indicated by the reference numeral 30 is pivoted. The backrest includes a main framing member lock side 32 of which extends from top to bottom of the backrest and beyond the pivot 28 to terminate at a further pivot 34 which is on a lug 36 fixed to the vehicle floor or to the seat slide part 22 as shown.

As best indicated by comparison of FIGS. 1 and 2, the guide 24 is located towards the front of the seat base when the seat is in the normal position for use (FIG. 1) and the seat is tipped by movement of the seat back in the direction of the arrow A FIG. 1 into the FIG. 2 position, which is accompanied by movement of the part 32 about the axis 34 and with similar hinging about axis 28, so that the straight portion of tube 18 runs through the guide 24. As will be appreciated from consideration of the geometry involved, the seat base frame 10 is lifted at the rear at least during the first part of the tipping forward movement. Depending upon the geometry, the rear of the seat base 10 may be lowered towards the end of the movement.

The guide 24 is provided in association with each of the lateral sides of the frame, that is each of the pedestal tubes 18 extends through a corresponding guide. Each guide comprises a pair of parallel lugs 40, see FIG. 3, and between the lugs is a lower guide or abutment 42 which is preferably in the form of a nylon or like slightly compressible roller. The upper guides 44 are preferably of metal but may also be formed of a resilient material and may similarly be nylon in the form of rollers.

It is particularly pointed out that the axis of abutment 44 is located forwardly of the axis of abutment 42 so that the two axes may be regarded as being in a common plane which is inclined to the axis of the straight portion 18 of the pedestal tube when the seat is in the FIG. 1 position, but which may be normal to the axis of the tube when the rear of the seat base frame 10 is lifted during the earlier part of the tipping movement.

The dimensions of the guide 24 and particularly the spacing between the adjacent surfaces of the abutments 42 44 is such that in the FIG. 1 position the abutment 42 (and possibly also the abutment 44) are compressed or indented by the tubes so that the tube is firmly gripped between these abutments. As the seat base frame 10 is lifted at the rear so as to align the tube axis more nearly with the normal to the said plane containing the axes of abutments 42 44 there is effectively a greater clearance for the tube to move in and hence the tipping forward is accompanied by free sliding of the tube 18 between the two abutments.

Hence, the tipping forward movement and similarly the return movement towards the FIG. 1 position are accomplished easily, but when the seat frame is in the FIG. 1 position the abutments form a snub which grips the tube 18 so as to prevent rattle as a result of vibration even when the seat is unoccupied.

It will be noted that the pivotal axis 28 is spaced above the peripheral framing member 12, so as to afford an appropriate mechanical advantage in the tipping forward movement but without requiring a particularly high pedestal, that is the limbs 14 16 of the pedestal can be dimensioned as required by other circumstances and without regard for the required position of the axis 28.

FIG. 3 also illustrates the seat slide construction incorporating a fixed channel member 50, that is fixed to the floor of the vehicle, and a second and embracing channel member 52 which carries the guide 24 and also the lug 36 and provides the abutment for the pedestal portion 20, with ball bearings 54 located between the two channels to permit free relative sliding when any conventional catch (not shown) holding the two channels in a fixed position is released.

In order to secure the seat in the normal position, so as to prevent unintended tipping forward for example during crash conditions, a catch 56 is pivoted to the pedestal tube 18 and engages in a slot in the slide channel 52. This arrangement may be duplicated on both sides of the seat. To release the catch, a flexible cable 58 is provided extending between a release lever 60 and the catch. This arrangement is preferably spring loaded and the catch pawl 56 has a suitably curved external edge so that it will automatically engage in the seat slide slot when the seat is returned to the FIG. 1 position.

Figure 4:
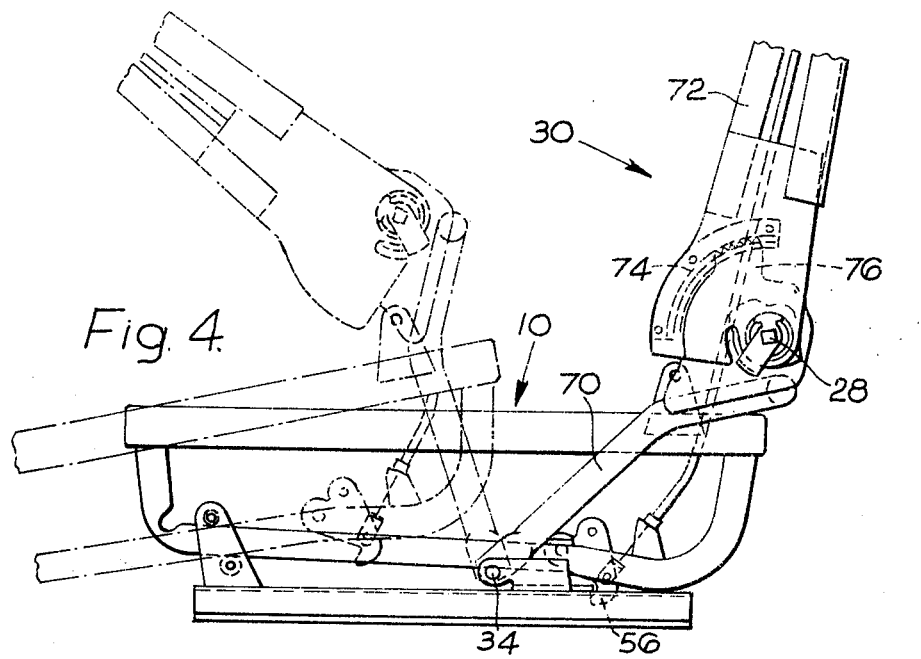
FIG. 4 is a view of a second embodiment showing the same in the normal position (full lines) and a tipped position (broken lines).

The arrangement so far described provides what may be called a "fixed angle" seat in the sense that in the normal position for use the backrest is at a predetermined angle to the seat base or cushion. It is however also possible to include a seat back inclination adjustment mechanism whilst using the features of the invention, and FIG. 4 illustrates a typical case. The difference here is that the backrest frame 30 is made in two parts, namely a lower part 70 which provides the pivotal axes 34 28 and an upper part 72 which is also independently pivoted on the axis 28, with a first set of teeth 74 provided on the one part and a second set of teeth 76 provided on the other part, together with means for example a cam for separating the teeth to allow the part 72 to be pivoted forwardly or rearwardly before the teeth are re-engaged. In any of the normal positions of inclination, with the teeth engaged, the seat may be tipped and then returned to the normal position in exactly the same way as the FIG. 1 to 3 embodiment.

In an alternative, not illustrated, instead of providing an upper abutment 44 in the form of a roller, the latter may be a metal bridge integral with the sidelimbs 40 of the guide and this may be curved as seen in side elevation, so as to conform to a radius of curvature connecting the pedestal limb 18 with the pedestal limb 14. In this event the guide will be located at the extreme front of the pedestal in the normal position of the seat, so that the curves abut.

I claim:

1. A vehicle seat comprising a seat back pivoted intermediate its ends to a seat base, and further pivoted at its lower end below the seat base to the vehicle floor, in which the seat base is slidable forwardly and tipped when the seat back is pivoted forward, and vice versa, characterized in that the seat base comprises a frame including at least one element in slidable engagement with a guide which is located on the floor adjacent the front of the seat base when the seat is in normal use position, said guide including upper and lower guide elements which are spaced apart in the fore and aft direction, said frame element extending through the gap between said upper and lower guide elements, and said lower guide element being located nearer to said seat back than said upper guide element.

2. A seat as claimed in claim 1 wherein the lower guide element is a roller.

3. A seat as claimed in claim 1 wherein the upper guide element is a roller.

4. A seat as claimed in claim 2 wherein the roller is resilient and deformable.

5. A seat as claimed in claim 2 wherein the roller is of nylon.

6. A seat as claimed in claim 1 wherein a catch is provided to lock the pivot between the seat back and the seat base.

7. A seat as claimed in claim 1 wherein the seat back includes an inclination adjustment mechanism.

* * * * *